US010899930B2

(12) United States Patent
Delst

(10) Patent No.: US 10,899,930 B2
(45) Date of Patent: Jan. 26, 2021

(54) ASYMMETRIC PIGMENT

(71) Applicant: VIAVI SOLUTIONS INC., Milpitas, CA (US)

(72) Inventor: Cornelis Jan Delst, Fairfax, CA (US)

(73) Assignee: VIAVI SOLUTIONS INC., San Jose, CA (US)

( * ) Notice: Subject to any disclaimer, the term of this patent is extended or adjusted under 35 U.S.C. 154(b) by 233 days.

(21) Appl. No.: 15/820,181

(22) Filed: Nov. 21, 2017

(65) Prior Publication Data
US 2019/0153233 A1 May 23, 2019

(51) Int. Cl.
C09C 1/00 (2006.01)
C09B 67/00 (2006.01)
C09D 5/03 (2006.01)
C09D 11/50 (2014.01)
B42D 25/369 (2014.01)
B41M 3/14 (2006.01)
(Continued)

(52) U.S. Cl.
CPC ........... C09C 1/0057 (2013.01); B41M 3/148 (2013.01); B42D 25/369 (2014.10); B42D 25/378 (2014.10); C09B 67/0098 (2013.01); C09C 1/003 (2013.01); C09C 1/006 (2013.01); C09C 1/0033 (2013.01); C09C 1/0039 (2013.01); C09C 1/0066 (2013.01); C09C 1/0075 (2013.01); C09D 5/035 (2013.01); C09D 11/50 (2013.01); H01F 10/10 (2013.01); C01P 2004/61 (2013.01); C01P 2006/40 (2013.01); C01P 2006/42 (2013.01); C01P 2006/63 (2013.01); C01P 2006/64 (2013.01); C01P 2006/66 (2013.01); C09C 2200/1008 (2013.01); C09C 2200/1016 (2013.01); C09C 2200/1091 (2013.01); C09C 2200/301 (2013.01); C09C 2200/302 (2013.01); C09C 2200/303 (2013.01); C09C 2200/304 (2013.01); C09C 2200/305 (2013.01); C09C 2200/306 (2013.01); C09C 2200/308 (2013.01); C09C 2200/40 (2013.01); C09C 2210/00 (2013.01); C09C 2220/00 (2013.01)

(58) Field of Classification Search
None
See application file for complete search history.

(56) References Cited

U.S. PATENT DOCUMENTS 6,695,905 B2 * 2/2004 Rozumek ............ C09B 67/0098
106/415
6,875,522 B2 * 4/2005 Seto ...................... C09C 1/0078
428/611
(Continued)

FOREIGN PATENT DOCUMENTS

| CN | 1400989 A | 3/2003 |
| CN | 106338790 | 1/2017 |
| DE | 102016110192 | 1/2017 |

(Continued)

Primary Examiner — Colleen P Dunn
Assistant Examiner — Ross J Christie
(74) Attorney, Agent, or Firm — Mannava & Kang, P.C.

(57) ABSTRACT

An asymmetric pigment including a first Fabry-Perot structure; and a second Fabry-Perot structure; wherein the first Fabry-Perot structure and the second Fabry-Perot structure have a similar hue angle within +/−45 degrees is disclosed. Other asymmetric pigments are also disclosed as well as methods of making the disclosed pigments.

20 Claims, 4 Drawing Sheets

(51) Int. Cl.
*H01F 10/10* (2006.01)
*B42D 25/378* (2014.01)

(56) References Cited

U.S. PATENT DOCUMENTS

2006/0077496 A1    4/2006  Argoitia et al.
2012/0326430 A1*  12/2012  Kohlmann ............ C09C 1/0015
                                                    283/85

FOREIGN PATENT DOCUMENTS

EP        1498545 A1 *  1/2005  ............... G02B 5/18
EP        1710604       10/2006

* cited by examiner

US 10,899,930 B2

ASYMMETRIC PIGMENT

FIELD OF THE INVENTION

The present disclosure generally relates to asymmetric pigments that can (i) include a visible color at angle, (ii) color shift, and (iii) have a small pigment size. Methods of making the asymmetric pigments are also disclosed.

BACKGROUND OF THE INVENTION

Color shifting magnetic pigments based on color by interference with an optical thickness of 2 or 4 quarterwave thickness at the reflection peak can be attractive from a hiding point of view because the flakes are thin. However, these flakes have a few drawbacks. In particular, the color at angle may not be very visible as the tilt angle required to see this color is high. The high tilt angle results in a low light reflection in most lighting conditions. Additionally, the flakes are hard to break into a small pigment size because the opaque magnetic core is relatively strong in combination with a low per flake weight.

Previously, in order to achieve a strong color that is visible at a high tilt angle and easy to alter, for example into flakes, a symmetric pigment having optically thick layers was made. However, the pigment with the optically thicker layers was more expensive to make. In order to minimize costs, pigments having optically thinner layers were made. However, the pigments with the optically thinner layers did not produce a strong color effect and were hard to alter, for example into flakes, because they possessed a high relative metal content and a low weight to surface ratio. Although the pigments with the optically thinner layers were cheaper to make, they exhibited a low color and/or color shift effect and were larger sized flakes that were visible in a color shifting colorant.

Dual cavity design pigments can achieve colors that are not achieved with 2 quarter wave or 4 quarter wave single cavity designs. However, production is not simple and the dual cavity design pigments are relatively thick, heavy, and expensive.

SUMMARY OF THE INVENTION

In an aspect, there is disclosed an asymmetric pigment comprising a first Fabry-Perot structure; and a second Fabry-Perot structure; wherein the first Fabry-Perot structure and the second Fabry-Perot structure have a similar hue angle within +/−45 degrees, and wherein the average thickness of the first Fabry-Perot structure and the second Fabry-Perot structure is a ratio of 1:1.5 to 1:2.5.

In another aspect, there is disclosed an asymmetric pigment comprising a Fabry-Perot structure; and a dual cavity; wherein the Fabry-Perot structure and the dual cavity have a similar hue angle within +/−45 degrees.

In a further aspect, there is disclosed a method of forming an asymmetric pigment comprising depositing on a substrate a first Fabry-Perot structure; and depositing a second Fabry-Perot structure on the first Fabry-Perot structure; wherein the first Fabry-Perot structure and the second Fabry-Perot structure have a similar hue angle within +/−45 degrees.

In a further aspect, there is disclosed a method for making a pigment comprising depositing on a substrate a Fabry-Perot structure; and depositing a dual cavity on the Fabry-Perot structure; wherein the Fabry-Perot structure and the dual cavity have a similar hue angle within +/−45 degrees.

In another aspect, there is disclosed a method for making a pigment comprising depositing on a substrate a dual cavity; and depositing a Fabry-Perot structure on the dual cavity; wherein the Fabry-Perot structure and the dual cavity have a similar hue angle within +/−45 degrees.

Additional features and advantages of various embodiments will be set forth, in part, in the description that follows, and will, in part, be apparent from the description, or may be learned by the practice of various embodiments. The objectives and other advantages of various embodiments will be realized and attained by means of the elements and combinations particularly pointed out in the description herein.

BRIEF DESCRIPTION OF THE DRAWINGS

The present disclosure in its several aspects and embodiments can be more fully understood from the detailed description and the accompanying drawings, wherein.

Throughout this specification and figures like reference numbers identify like elements.

DETAILED DESCRIPTION OF THE INVENTION

Figure 1:
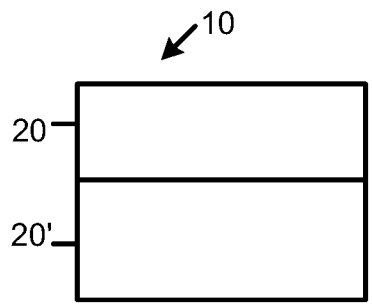
FIG. 1 is a cross-section view of an asymmetric pigment according to an aspect of the invention.

It is to be understood that both the foregoing general description and the following detailed description are exemplary and explanatory only, and are intended to provide an explanation of various embodiments of the present teachings.

In its broad and varied embodiments, disclosed herein are pigments 10, such as asymmetric pigments, and a method of manufacturing the pigments 10. The pigments 10 can be blended with a liquid medium to form a color shifting colorant. In an aspect, an asymmetric design may result in a lower chromaticity at angle resulting in a color to dark shift. For magnetically aligned pigments, this may be an attractive aspect because it may result in areas with abundant color surrounded by, or bordering to, areas that show much less color than with a symmetric pigment. The colored area may appear to move with a change in viewing angle.

FIGS. 1, 3, and 4A-4C illustrate various pigments 10, such as optical devices in the form of flakes, foils, or sheets, according to various examples. Although, these Figures illustrate specific layers in specific orders, one of ordinary skill in the art would appreciate that the pigment 10 can include any number of layers in any order. Additionally, the composition of any particular layer can be the same or different from the composition of any other layer. It is also envisioned that the pigments 10 disclosed herein can include additional layers, such as intermediate layers or intervening layers. It is also envisioned that the layers of the pigments 10 may be surfaced modified, such as by oxidation. It will be appreciated that the disclosed pigments 10 can be dimensionally asymmetric, i.e., one side of the pigment can be thinner, for example can be less physically and/or optically thick, as compared to an opposite side of the pigment 10, which can be thicker, such as physically and/or optically.

The pigments 10 disclosed herein can provide a balance between cost and color effect. Namely, the pigments 10 are asymmetric having optically thinner layers on one side, i.e., to achieve a lower cost, and having optically thicker layers on an opposite side, i.e., to achieve a stronger color at angle effect. The asymmetric design can result in a higher per flake weight than optically thinner symmetric flakes and can improve breaking of the pigment into pigment flakes. In addition, a color-shifting colorant including the pigments 10 can have a homogenous distribution of per flake weight in order to avoid weight induced separation in a paint or ink vehicle either in the preparation, storage or application phase. For example, the use of the pigments 10 in a color shifting colorant can result in a 50/50 chance of either side of the pigment 10 facing up because all of the pigments 10 present in the color shifting colorant can have the same weight. For example, some of the pigments 10 can lay with, for example, a first Fabry-Perot structure 20 side up, and some of the pigments 10 can lay with the second Fabry-Perot structure 20' side up. In another aspect, some of the pigments 10 can lay with the Fabry-Perot structure 20 (such as either a 2 or 4 quarter wave stack) side up, and some of the pigments 10 can lay with a dual cavity 26 side up.

Figure 2A:
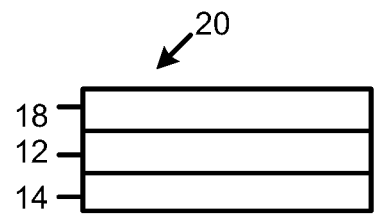
FIG. 2A is a cross-section of a Fabry-Perot structure according to an aspect of the invention.
Figure 2B:
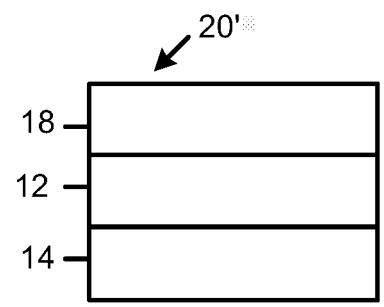
FIG. 2B is a cross-section of a Fabry-Perot structure according to another aspect of the invention.
Figure 2C:
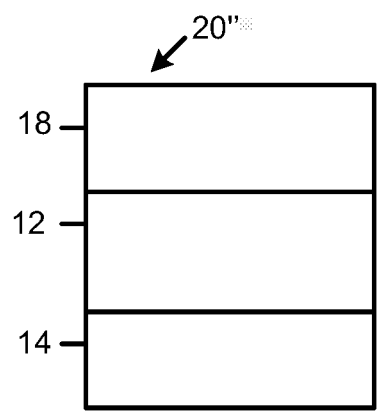
FIG. 2C is a cross-section of a Fabry-Perot structure according to another aspect of the invention.

The pigment 10 can be asymmetric including an optically thinner side and an optically thicker side. As shown in FIG. 1, in an aspect, the pigment 10 can include a first Fabry-Perot structure 20; and a second Fabry-Perot structure 20'; wherein the first Fabry-Perot structure and the second Fabry-Perot structure have a similar hue angle within +/−45 degrees, and wherein the average thickness of the first Fabry-Perot structure and the second Fabry-Perot structure is a ratio of 1:1.5 to 1:2.5. The average thickness of the first Fabry-Perot structure and the second Fabry-Perot structure is a ratio of 2:2.5 to 2:3.5, for example, a ratio of 1:2.5 to 1:3.5. In another aspect, the asymmetric pigment can include a first Fabry-Perot structure; and a second Fabry-Perot structure; wherein the first Fabry-Perot structure and the second Fabry-Perot structure have a similar hue angle within +/−45 degrees. A Fabry-Perot structure (first 20, second 20', third 20''', etc.) can each independently include a reflector layer 14, a dielectric layer 12, and an absorber layer 18, as shown in FIGS. 2A-2C. It will be understood that any two Fabry-Perot structures 20 can be used in forming the pigment 10 so long as each Fabry-Perot structure 20 has a different optical thickness.

In an aspect, an optical thickness of each of the first Fabry-Perot structure 20 and the second Fabry-Perot structure 20' can be different. For example, the first Fabry-Perot structure 20 can include a 2 quarter wave optical thickness ranging from about 200 nm to about 400 nm or a 4 quarter wave optical thickness ranging from about 400 nm to about 600 nm. As a further example, the second Fabry-Perot structure 20 can include a 4 quarter wave optical thickness ranging from about 400 nm to about 600 nm or a 6 quarter wave optical thickness ranging from about 600 nm to about 800 nm.

An asymmetric pigment 10, such as shown in FIG. 1, can include a first Fabry-Perot structure 20 including a 2 quarter wave optical thickness ranging from about 200 to about 400 nm; and a second Fabry-Perot structure 20' including a 4 quarter wave optical thickness ranging from about 400 to about 600 nm.

In another aspect, an asymmetric pigment 10 can include a first Fabry-Perot structure 20' including a 4 quarter wave optical thickness ranging from about 400 to about 600 nm; and a second Fabry-Perot structure 20'' including a 6 quarter wave optical thickness ranging from about 600 to about 800 nm.

The asymmetric pigments 10 can be combined with a liquid medium to form a color shifting colorant. The color shifting colorant can be, for example, an ink or a paint. Non-limiting examples of a liquid medium can include solvents, for example acetates, such as ethyl acetate, propyl acetate, and butyl acetate; acetone; water; ketones, such as dimethyl ketone (DMK), methylethyl ketone (MEK), secbutyl methyl ketone (SBMK), ter-butyl methyl ketone (TBMK), cyclopenthanon, and anisole; glycol and glycol derivatives, such as propylene glycol methyl ether, and propylene glycol methyl ether acetate; alcohols, such as isopropyl alcohol, and diacetone alcohol; esters, such as malonates; heterocyclic solvents, such as n-methyl pyrrolidone; hydrocarbons, such as toluene, and xylene; coalescing solvents, such as glycol ethers; and mixtures thereof. In an aspect, the liquid medium can be present in an amount ranging from about 0% to about 99.9%, for example from about 0.005% to about 99%, and as a further example from about 0.05% to about 90% by weight relative to the total weight of the color shifting colorant.

Each of the disclosed exemplary pigments 10 can be altered, such as mechanically altered, for example by breaking, to form flakes, foils, or sheets. The pigments 10 can be formed into flakes, foils, or sheets ranging from about 2 microns to about 40 microns in dimension. The pigments 10 can have a D50 (50% of pigments larger than 20 microns and 50% smaller) of 20 microns, with a D0.01 (99.9% of pigments larger than 4 microns) of 4 microns and a D99.99 (0.01% of pigments smaller than 80 microns) of 80 microns, Pigments 10 with a small pigment size, in the range of 5 to 15 micron D50, can result in less grainy prints but this flake size can be difficult to achieve with strong interference colors like gold, orange, and red without using the asymmetric configuration because the collision impact of optically thinner, lighter weight, flakes in an aft based grinding system is lower. In an aspect, the pigments 10 can have a D50 around 11 microns and can possess strong interference colors.

Figure 6:
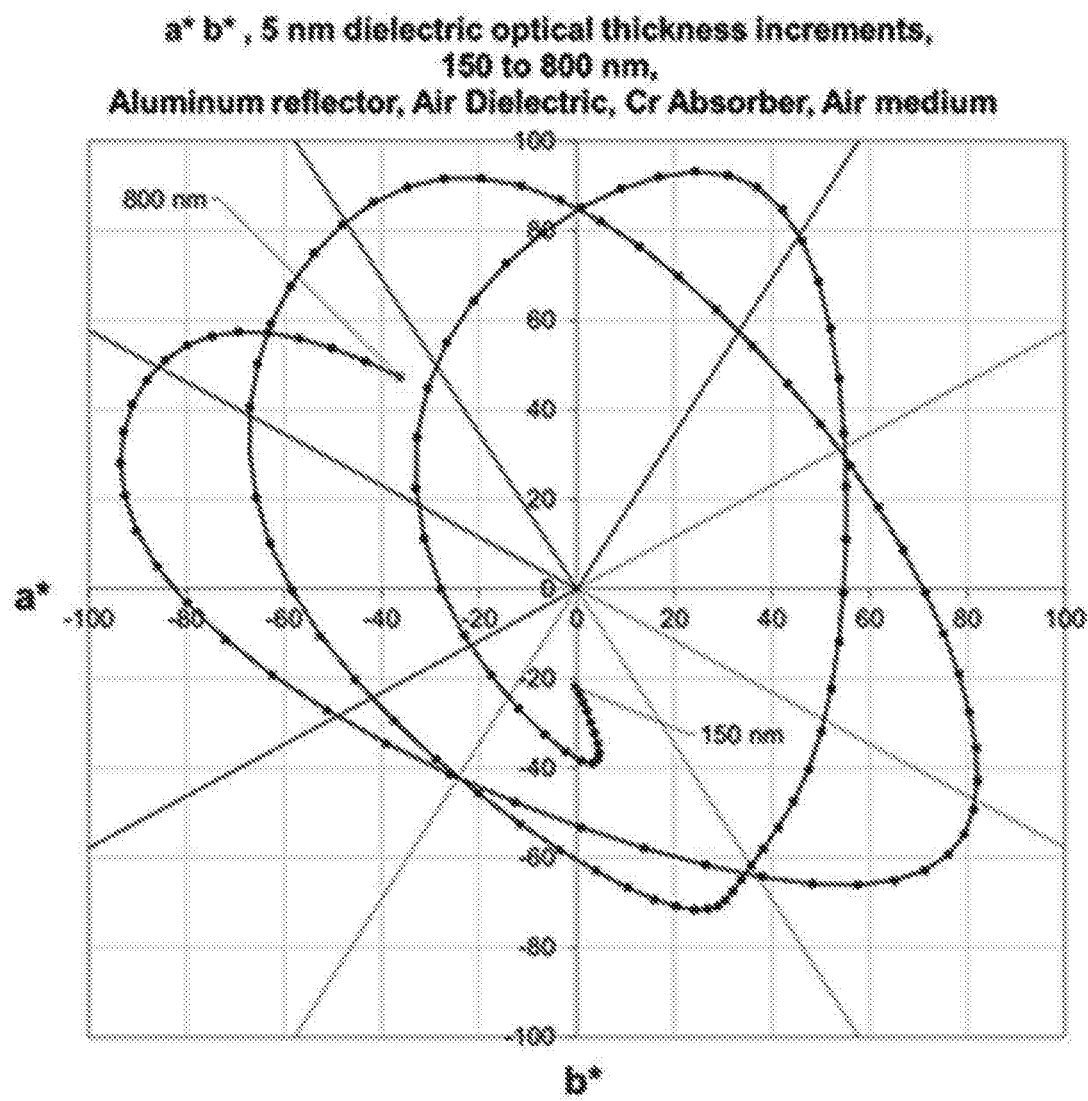
FIG. 6 is an L.*a*b* graph illustrating hue angle.

The pigments 10 can each have a similar (within plus or minus 45 degree) hue angle, for example as shown in FIG. 6. Two more distinctly different colors for each side of the pigment 10 resulting in a third color by additive blending is not within the scope. It is common to make color shifting interference pigments with a slightly different dielectric thickness on each side to allow blend control over chromaticity and hue. This is not within the scope of this invention. This minor thickness difference may result in a different hue angle but does not significantly impact the color at angle or the breaking characteristics.

In some examples, the pigment 10 can exhibit optical interference. Alternatively, in some examples, the pigment 10 cannot exhibit optical interference. In an aspect, the pigment 10 can exploit interference to generate color. In another aspect, the pigment 10 cannot exploit interference to generate color.

Figure 3:
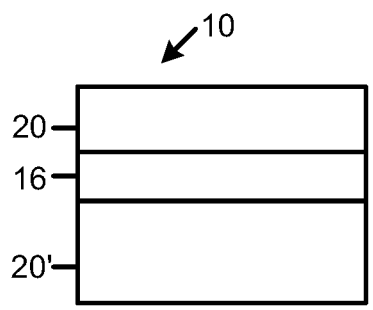
FIG. 3 is a cross-section view of an asymmetric pigment according to another aspect of the invention.

In a further aspect, the asymmetric pigment 10 can include a magnetic-containing layer 16 sandwiched between the first Fabry-Perot structure 20 and the second Fabry-Perot structure 20', as shown in FIG. 3. In an aspect, a magnetic-containing layer 16 can be sandwiched between a second Fabry-Perot structure 20' and a third Fabry-Perot structure 20" (not shown). the asymmetric pigment 10 can include a magnetic-containing layer 16 sandwiched between a Fabry-Perot structure 20 and a dual cavity, as shown in FIG. 4C. As discussed more fully herein, the reflector layer 14 and/or the absorber layer 18 can each independently include magnetic-containing materials, which can also act as a magnetic-containing layer 16 for any of the Fabry-Perot structures 20, 20', or 20".

The magnetic-containing layer 16 can include magnetic permeable, magnetic orientable materials, magnetic materials, and combinations thereof. A magnetic material, such as ferromagnetic and ferrimagnetic materials, includes but is not limited to, nickel, cobalt, iron, gadolinium, terbium, dysprosium, erbium, and their blends, alloys or oxides. Other examples of blends or alloys include, but are not limited to, Fe/Si, Fe/Ni, Fe/Co, Fe/Ni/Mo, Fe/Cr, Ni/Cr, and combinations thereof. In an aspect, the magnetic-containing layer 16 can include a polymer containing iron oxide particles. Hard magnets of the type $SmCo_5$, $NdCo_5$, $Sm_2Co_{17}$, $Nd_2Fe_{14}B$, $Sr_6Fe_2O_3$, $TbFe_2$, Al—Ni—Co, and combinations thereof, can also be used as well as spinel ferrites of the type $Fe_3O_4$, $NiFe_2O_4$, $MnFe_2O_4$, $CoFe_2O_4$, or garnets of the type YIG or GdIG, and combinations thereof. In an aspect, the magnetic material may be ferritic stainless steel. The magnetic material can be selected for its reflecting or absorbing properties as well as its magnetic properties. The magnetic-containing layer 16 may be formed by a material having magnetic and non-magnetic particles, or magnetic particles within non-magnetic medium, for example cobalt-doped zinc oxide film deposited on a substrate. The magnetic-containing layer 16 can either be a distinct layer or can either function as a reflector layer 14 or an absorber layer 18.

Although this broad range of magnetic materials can be used, "soft" magnets can be used in an aspect. As used herein, the term "soft magnets" refers to any material exhibiting ferromagnetic properties but having a remanence that is substantially zero after exposure to a magnetic force. Soft magnets can show a quick response to an applied magnetic field, but have very low (coercive fields (Hc) =0.05-300 Oersted (Oe)) or zero magnetic signatures, or retain very low magnetic lines of force after the magnetic field is removed. Similarly, as used herein, the term "hard magnets" (also called permanent magnets) refers to any material that exhibits ferromagnetic properties and that has a long lasting remanence after exposure to a magnetizing force. A ferromagnetic material is any material that has permeability substantially greater than 1 and that exhibits magnetic hysteresis properties. In an aspect, any magnetic material can be used in the magnetic-containing layer 16 so long as the material enables the orienting of the pigment 10 in a magnetic field.

The magnetic-containing layer 16 can have a thickness ranging from about 10 nm to about 100 nm, for example from about 35 nm to about 45 nm, and as a further example from about 40 nm. The magnetic-containing layer 16 can be deposited to a thickness so that it is substantially opaque. In an aspect, the magnetic-containing layer 16 can be deposited to a thickness so that it is not substantially opaque.

The magnetic-containing layer 16 can be formed using conventional deposition processes, such as physical vapor deposition techniques; as well as sputtering including magnetron sputtering; thermal evaporation; electron beam evaporation; and cathodic arc evaporation. In an aspect, the magnetic-containing layer 16 can also be formed using a liquid coating process.

Figure 4A:
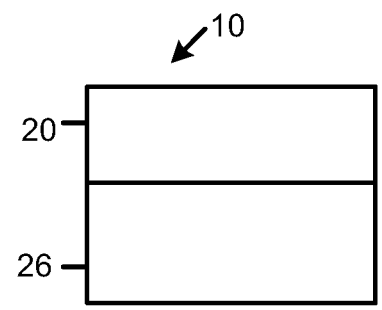
FIG. 4A is a cross-section view of an asymmetric pigment according to another aspect of the invention.
Figure 4B:
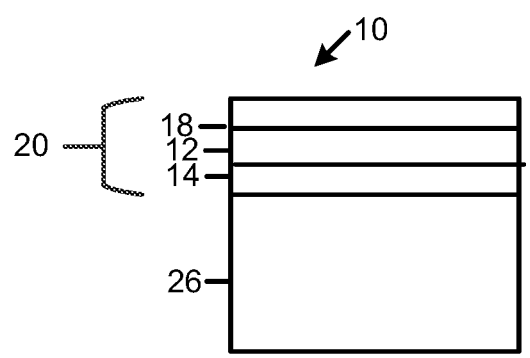
FIG. 4B is a cross-section view of an asymmetric pigment according to another aspect of the invention.
Figure 4C:
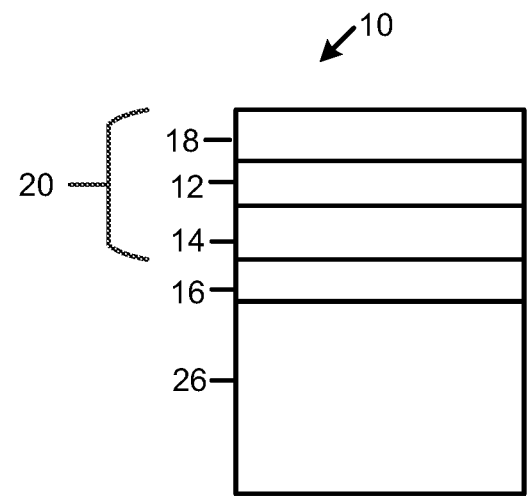
FIG. 4C is a cross-section view of an asymmetric pigment according to another aspect of the invention.

In another aspect, the asymmetric pigment 10 can include a Fabry-Perot structure 20 and a dual cavity 26, as shown in FIGS. 4A-4C, wherein the Fabry-Perot structure and the dual cavity have a similar hue angle within +/−45 degrees. The Fabry-Perot structure 20 can be as described in relation to FIGS. 1 and 2A-2C.

Figure 5A:
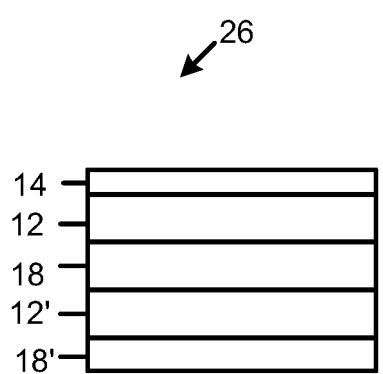
FIG. 5A is a cross-section of a dual cavity according to an aspect of the invention.
Figure 5B:
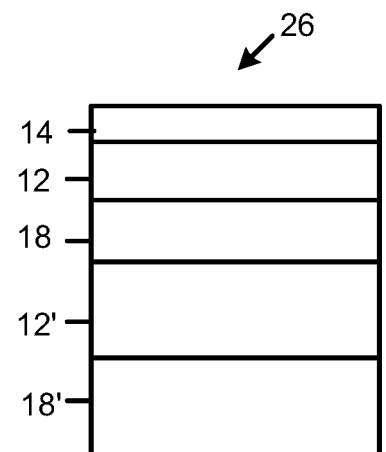
FIG. 5B is a cross section of a dual cavity according to another aspect of the invention.
Figure 5C:
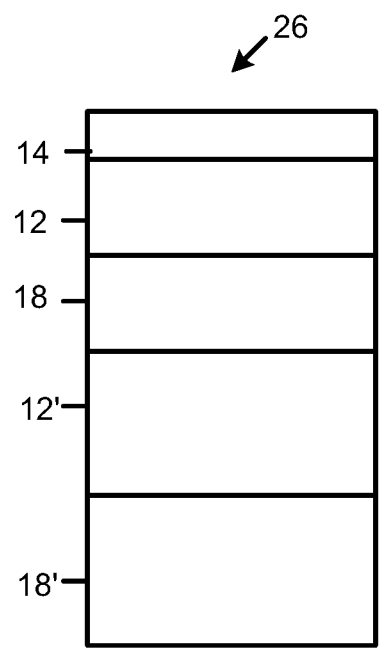
FIG. 5C is a cross section of a dual cavity according to another aspect of the invention.

The dual cavity 26 can include a reflector layer 14, and a stack of alternating dielectric layers 12 and absorber layers 18, as shown in FIGS. 5A-5C. For example, the stack of alternating dielectric layers 12 and absorber layers 18 can include a first dielectric layer 12, a first absorber layer 18, a second dielectric layer 12', and a second absorber layer 18'. The stack of alternating dielectric layers 12 and absorber layers 18 can include any number of each layer.

The first dielectric layer 12 can include a quarter wave optical thickness chosen from a 2 quarter wave optical thickness, a 4 quarter wave optical thickness, and a 6 quarter wave optical thickness. The second dielectric layer 12' can include a quarter wave optical thickness chosen from a 2 quarter wave optical thickness, a 4 quarter wave optical thickness, and a 6 quarter wave optical thickness.

As shown in FIG. 5A, the dual cavity 26 can include a first dielectric layer 12 having a 2 quarter wave optical thickness ranging from about 200 to about 400 nm; and a second dielectric layer 12' having 2 quarter wave optical thickness ranging from about 200 to about 400 nm. In another aspect, as shown in FIG. 5B, the dual cavity 26 can include a first dielectric layer 12 having a 2 quarter wave optical thickness ranging from about 200 to about 400 nm; and a second dielectric layer 12' having 4 quarter wave optical thickness ranging from about 400 to about 600 nm. In a further aspect, as shown in FIG. 5C, the dual cavity 26 can include a first dielectric layer 12 having a 4 quarter wave optical thickness ranging from about 400 to about 600 nm; and a second dielectric layer 12' having 6 quarter wave optical thickness ranging from about 600 to about 800 nm.

The reflector layer 14 of the Fabry-Perot structure 20 and/or the dual cavity 26 can be a wideband reflector, e.g., spectral and Lambertian reflector (e.g., white $TiO_2$). The reflector layer 14 can each independently include metals, non-metals, and/or metal blends or alloys. The terms "metallic" or "metallic layer" used herein, unless otherwise stated, are intended to include all metals, metal blends and alloys, pure metal or metal alloy containing materials, compound, compositions, and/or layers.

In one example, the materials for the reflector layer 14 can include any materials that have reflective characteristics in the desired spectral range. For example, any material with a reflectance ranging from 50% to 100% in the desired spectral range. An example of a reflective material can be aluminum, which has good reflectance characteristics, is inexpensive, and easy to form into or deposit as a thin layer. Other materials can also be used in place of aluminum. For example, copper, silver, gold, platinum, palladium, nickel, cobalt, niobium, chromium, tin, and combinations, blends or alloys of these or other metals can be used as reflective materials. In an aspect, the material for the reflector layer 14 can be a white or light colored metal. In other examples, the reflector layer 14 can include, but is not limited to, the transition and lanthanide metals and combinations thereof;

as well as metal carbides, metal oxides, metal nitrides, metal sulfides, a combination thereof, or mixtures of metals and one or more of these materials.

The thickness of the reflector layer 14 can range from about 5 nm to about 5000 nm, although this range should not be taken as restrictive. For example, the lower thickness can be selected so that the reflector layer 14 provides a maximum transmittance of 0.8. Additionally, or alternatively, for a reflector layer 14 including aluminum the minimum optical density (OD) can be from about 0.1 to about 4 at a wavelength of about 550 nm.

In order to obtain a sufficient optical density and/or achieve a desired effect, a higher or lower minimum thicknesses can be required depending upon the composition of the reflector layer 14. In some examples, the upper limit can be about 5000 nm, about 4000 nm, about 3000 nm, about 1500 nm, about 200 nm, and/or about 100 nm. In one aspect, the thickness of the reflector layer 14 can range from about 10 nm to about 5000 nm for example, from about 15 nm to about 4000 nm, from about 20 nm to about 3000 nm, from about 25 nm to about 2000 nm, from about 30 nm to about 1000 nm, from about 40 nm to about 750 nm, or from about 50 nm to about 500 nm, such as from about 60 nm to about 250 nm or from about 70 nm to about 200 nm.

In one aspect, the dielectric layer 12 of the Fabry-Perot structure 20 and/or the dual cavity 26 can be disposed on the reflector layer 14. The dielectric layer 12 can have a refractive index of greater or less than about 1.5. For example, the dielectric layer 12 can have a refractive index of approximately 1.5. The refractive index of a dielectric layer 12 can be selected to provide a degree of color travel required wherein color travel can be defined as the change in hue angle measured in L*a*b* color space with the viewing angle.

The optical thickness is a well-known optical parameter defined as the product nd, where n is the refractive index of the layer and d is the physical thickness of the layer. Typically, the optical thickness of a layer is expressed in terms of a quarter wave optical thickness (QWOT) that is equal to $4\eta d/\lambda$, where $\lambda$ is the wavelength at which a QWOT condition occurs. The optical thickness of dielectric layer 12 can range from about 2 QWOT at a design wavelength of about 200 nm to about 9 QWOT at a design wavelength of about 700 nm, and for example 2-6 QWOT at 200-800 nm, depending upon the color shift desired. Suitable materials for dielectric layer 12 include those having a "high" index of refraction, defined herein as greater than about 1.65, as well as those have a "low" index of refraction, which is defined herein as about 1.65 or less. For the purpose of this specification the qualification 2, 4 or 6 quarter wave qualification is made based on FIG. 6 that plots hue angle at normal angle versus dielectric thickness. As an example a gold color (around 90 degree hue angle) is achieved at an optical thickness of 140 nm (2 quarter wave), 280 nm (4 quarter wave) and 430 nm (6 quarter wave). Some of the colors achieved with specific quarter wave counts are less attractive for the human eye due to low chromaticity or low lightness but most colors in the visible spectrum can be made with at least 2 quarter wave counts. At more than 2 quarter waves, multiple reflection peaks fit in the visible spectrum and this impacts the chromaticity at specific hue angles. A 2 quarter wave green has a very low chromaticity and this color is usually made as either a 4 or a 6 quarter wave stack. A 6 quarter wave green has a reflection peak in the blue and will therefore have a higher chromaticity when made as a bluish green. Magenta or red works well as a 2 or a 4 quarter wave stack, yet not as well as a 6 quarter wave stack as it has an unattractive low lightness.

Examples of suitable high refractive index materials for dielectric layer 12 include zinc sulfide (ZnS), zinc oxide (ZnO), zirconium oxide ($ZrO_2$), titanium dioxide ($TiO_2$), carbon (C), indium oxide ($In_2O_3$), indium-tin-oxide (ITO), tantalum pentoxide ($Ta_2O_5$), ceric oxide ($CeO_2$), yttrium oxide ($Y_2O_3$), europium oxide ($Eu_2O_3$), iron oxides such as (II) diiron (III) oxide ($Fe_3O_4$) and ferric oxide ($Fe_2O_3$), hafnium nitride (HfN), hafnium carbide (HfC), hafnium oxide ($HfO_2$), lanthanum oxide ($La_2O_3$), magnesium oxide (MgO), neodymium oxide ($Nd_2O_3$), praseodymium oxide ($Pr_6O_{11}$), samarium oxide ($Sm_2O_3$), antimony trioxide ($Sb_2O_3$), silicon carbide (SiC), silicon nitride ($Si_3N_4$), silicon monoxide (SiO), selenium trioxide ($Se_2O_3$), tin oxide ($SnO_2$), tungsten trioxide ($WO_3$), combinations thereof, and the like.

Suitable low refractive index materials for dielectric layer 12 include silicon dioxide ($SiO_2$), aluminum oxide ($Al_2O_3$), metal fluorides such as magnesium fluoride ($MgF_2$), aluminum fluoride ($AlF_3$), cerium fluoride ($CeF_3$), lanthanum fluoride ($LaF_3$), sodium aluminum fluorides (e.g., $Na_3AlF_6$ or $Na_5Al_3F_{14}$), neodymium fluoride ($NdF_3$), samarium fluoride ($SmF_3$), barium fluoride ($BaF_2$), calcium fluoride ($CaF_2$), lithium fluoride (LiF), combinations thereof, or any other low index material having an index of refraction of about 1.65 or less. For example, organic monomers and polymers can be utilized as low index materials, including dienes or alkenes such as acrylates (e.g., methacrylate), perfluoroalkenes, polytetrafluoroethylene (Teflon), fluorinated ethylene propylene (FEP), combinations thereof, and the like.

The dielectric layer 12 can be deposited or printed or otherwise coated as a dielectric stack having a predetermined number of layers. In this example, the stack can include one or more layers of a low refractive index material and one or more layers of a high refractive index material. The layers having low refractive index material (low refractive index layers) and the layers having high refractive index material (high refractive index layers) can alternate. For example, a high refractive index layer can be deposited or printed on the reflector layer 14. A low refractive index layer can then be deposited on its corresponding high refractive index layer. This process can be repeated as many times as necessary to create a dielectric layer 12. The alternating layers can be stacked in any sequence, for example, the layers can be stacked in a sequence of $(H/L)_n$, $(H/L)_nH$, or $L(H/L)_n$ wherein H denotes higher refractive index layer and L denotes a lower refractive index layer. The number of alternating low refractive index layers and the high refractive index layers (n) can range from about 2 to over about 75, such as from about 10 to about 50 alternating layers, or for example from about 5 to about 25 alternating layers. In one aspect, the dielectric stack can comprise liquid coating printed layers alternating in composition that increase the effective refractive index in another layer. Any number of layers can be printed using any number of different materials. In this manner, the tailoring the optical design is possible by controlling the layer thickness and refractive index of each dielectric layer 12.

In each aspect, the dielectric layer 12 can be a transparent layer or can be a colored layer. The performance of the dielectric layer 12 can be determined based upon the selection of materials present in the dielectric layer 12. It is believed that the dielectric layer 12 can achieve high performance in transmission, reflection, and absorption of light based upon the composition of the dielectric layer 12. In an aspect, the dielectric layer 12 can include a composition that allows for a wider range of materials configured to increase the control of the optical performance of the dielectric layer 12. In an aspect, the dielectric layer 12 can improve at least one of the following properties: flake handling, corrosion, alignment, and environmental performance of a metal layer.

The dielectric layer can have a nominal optical thickness ranging from about 130 nm to about 450 nm. The thickness of the dielectric layer 12 can be used to determine the overall color. When deviations from the nominal optical thickness vary too much, different areas or flakes have a different or even complementary color and when blended, a loss of chromaticity is observed.

The absorber layer 18 can be disposed on the dielectric layer 12. The absorber layer 18 can independently include metals, non-metals, or metal blends or alloys. In one example, the materials for the absorber layer 18 can include any absorber material, including both selective absorbing materials and nonselective absorbing materials. For example, the absorber layer 18 can be formed of nonselective absorbing metallic materials deposited to a thickness at which the layer is at least partially absorbing, or semi-opaque. An example of a non-selective absorbing material can be a gray metal, such as chrome or nickel. An example of a selective absorbing material can be copper or gold. In an aspect, the absorbing material can be chromium. Non-limiting examples of suitable absorber materials include metallic absorbers such as chromium, aluminum, silver, nickel, palladium, platinum, titanium, vanadium, cobalt, iron, tin, tungsten, molybdenum, rhodium, niobium, copper, as well as other absorbers such as carbon, graphite, silicon, germanium, cermet, ferric oxide or other metal oxides, metals mixed in a dielectric matrix, and other substances that are capable of acting as a uniform or selective absorber in the visible spectrum. Various combinations, mixtures, compounds, or alloys of the above absorber materials that may be used to form the absorber layer 18.

Examples of suitable alloys of the above absorber materials can include Inconel (Ni—Cr—Fe), stainless steels, Hastalloys (Ni—Mo—Fe; Ni—Mo—Fe—Cr; Ni—Si—Cu) and titanium-based alloys, such as titanium mixed with carbon (Ti/C), titanium mixed with tungsten (Ti/W), titanium mixed with niobium (Ti/Nb), and titanium mixed with silicon (Ti/Si), and combinations thereof. Other examples of suitable compounds for the absorber layer 18 include, but are not limited to, titanium-based compounds such as titanium silicide ($TiSi_2$), titanium boride ($TiB_2$), and combinations thereof. Alternatively, the absorber layer 18 can be composed of a titanium-based alloy deposited in a matrix of Ti, or can be composed of Ti deposited in a matrix of a titanium-based alloy or blend. For example, the absorber layer 18 can include chromium.

The absorber layer 18 can also be formed of a magnetic material, such as a cobalt nickel alloy or blend or an Iron Chrome alloy or blend. This can simplify the manufacture of a magnetic color shifting device or structure by reducing the number of materials required.

The absorber layer 18 can be formed to have a physical thickness in the range from about 1 nm to about 50 nm, such as from about 5 nm to about 10 nm, depending upon the optical constants of the absorber layer material and the desired peak shift. The absorber layer 18 can be composed of the same material or a different material if more than one absorber layer 18 is present in a pigment 10, such as shown in FIG. 5C, and can have the same or different physical thickness for each layer.

There is also a disclosed a method for manufacturing a pigment 10, as described herein. The method can comprise depositing on a substrate a first Fabry-Perot structure 20; and depositing on the first Fabry-Perot structure 20 a second Fabry-Perot structure 20'. In another aspect, the method can include depositing on a substrate a second Fabry-Perot structure 20'; and depositing on the second Fabry-Perot structure 20' a first Fabry-Perot structure 20.

In another aspect, the method for manufacturing a pigment 10 can comprise depositing a dual cavity 26 on a substrate; and depositing a Fabry-Perot structure 20 on the dual cavity 26. In another aspect, the method for manufacturing a pigment 10 can comprise depositing a Fabry-Perot structure 20 on a substrate; and depositing a dual cavity 26 on the Fabry-Perot structure 20.

The substrate can be made of a flexible material. The substrate can be any suitable material that can receive the deposited layers. Non-limiting examples of suitable substrate materials include polymer web, such as polyethylene terephthalate (PET), glass, silicon wafers, etc. The substrate can include a release layer.

Any or all of the layers of the pigment 10 can be deposited onto the substrate by conventional deposition processes, such as physical vapor deposition, chemical vapor deposition, thin-film deposition, atomic layer deposition, etc., including modified techniques such as plasma enhanced and fluidized bed. One or more of the layers can be deposited using a liquid coating process using, for example a slot die apparatus. The liquid coating process includes, but is not limited to: slot-bead, slide bead, slot curtain, slide curtain, in single and multilayer coating, tensioned web slot, gravure, roll coating, and other liquid coating and printing processes that apply a liquid on to a substrate to form a liquid layer or film that is subsequently dried and/or cured. The liquid coating process can allow for the transfer of the composition at a faster rate as compared to other deposition techniques, such as vapor deposition.

The substrate can then be released from the deposited layers to create the pigment 10, for example as shown in FIGS. 1, 3 and 4A-4C. In an aspect, the substrate can be cooled to embrittle an associated release layer. In another aspect, the release layer could be embrittled for example by heating and/or curing with photonic or e-beam energy, to increase the degree of cross-linking, which would enable stripping. The deposited layers can then be stripped mechanically, such as by sharp bending or brushing of the surface. The released and stripped layers can be sized into pigment 10, such as an optical device in the form of a flake, foil, or sheet, using known techniques.

In another aspect, the deposited layers can be transferred from the substrate to another surface. The deposited layers can be punched or cut to produce large flakes with well-defined sizes and shapes.

There is also disclosed a method for forming an asymmetric pigment comprising: depositing on a substrate a first Fabry-Perot structure; and depositing a second Fabry-Perot structure on the first Fabry-Perot structure; wherein the first Fabry-Perot structure and the second Fabry-Perot structure have a similar hue angle within +/−45 degrees.

There is also disclosed a method for making a pigment comprising: depositing on a substrate a Fabry-Perot structure; and depositing a dual cavity on the Fabry-Perot structure; wherein the Fabry-Perot structure and the dual cavity have a similar hue angle within +/−45 degrees.

There is also disclosed a method for making a pigment comprising: depositing on a substrate a dual cavity; and depositing a Fabry-Perot structure on the dual cavity;

wherein the Fabry-Perot structure and the dual cavity have a similar hue angle within +/−45 degrees.

From the foregoing description, those skilled in the art can appreciate that the present teachings can be implemented in a variety of forms. Therefore, while these teachings have been described in connection with particular embodiments and examples thereof, the true scope of the present teachings should not be so limited. Various changes and modifications may be made without departing from the scope of the teachings herein.

This scope disclosure is to be broadly construed. It is intended that this disclosure disclose equivalents, means, systems and methods to achieve the devices, activities and mechanical actions disclosed herein. For each device, pigment, method, mean, mechanical element or mechanism disclosed, it is intended that this disclosure also encompass in its disclosure and teaches equivalents, means, systems and methods for practicing the many aspects, mechanisms and devices disclosed herein. Additionally, this disclosure regards a coating and its many aspects, features and elements. Such a device can be dynamic in its use and operation, this disclosure is intended to encompass the equivalents, means, systems and methods of the use of the device and/or pigment of manufacture and its many aspects consistent with the description and spirit of the operations and functions disclosed herein. The claims of this application are likewise to be broadly construed.

The description of the inventions herein in their many embodiments is merely exemplary in nature and, thus, variations that do not depart from the gist of the invention are intended to be within the scope of the invention. Such variations are not to be regarded as a departure from the spirit and scope of the invention.

We claim:

1. An asymmetric pigment comprising:
a first Fabry-Perot structure; and
a second Fabry-Perot structure;
wherein the first Fabry-Perot structure and the second Fabry-Perot structure have a similar hue angle within +/−45 degrees;
and wherein the average thickness of the first Fabry-Perot structure and the second Fabry-Perot structure is a ratio of 1:1.5 to 1:2.5.

2. The pigment of claim 1, wherein the first Fabry-Perot structure and the second Fabry-Perot structure each independently include a reflector layer, a dielectric layer, and an absorber layer.

3. The pigment of claim 1, wherein an optical thickness of each of the first Fabry-Perot structure and the second Fabry-Perot structure is different.

4. The pigment of claim 1, wherein the first Fabry-Perot structure includes a 2 quarter wave optical thickness ranging from about 200 to about 400 nm.

5. The pigment of claim 1, wherein the first and the second Fabry-Perot structure can each independently include a 4 quarter wave optical thickness ranging from about 400 to about 600 nm.

6. The pigment of claim 1, wherein the second Fabry-Perot structure includes a 6 quarter wave optical thickness ranging from about 600 to about 800 nm.

7. The pigment of claim 1, wherein the first Fabry-Perot structure includes a 2 quarter wave optical thickness ranging from about 200 to about 400 nm; and
wherein the second Fabry-Perot structure includes a 4 quarter wave optical thickness ranging from about 400 to about 600 nm.

8. The pigment of claim 1, wherein the first Fabry-Perot structure includes a 4 quarter wave optical thickness ranging from about 400 to about 600 nm; and
wherein the second Fabry-Perot structure includes a 6 quarter wave optical thickness ranging from about 600 to about 800 nm.

9. The pigment of claim 1, further comprising a magnetic-containing layer disposed between the first Fabry-Perot structure and the second Fabry-Perot structure.

10. A color shifting colorant comprising:
the pigment of claim 1; and
a liquid medium.

11. An asymmetric pigment comprising:
a Fabry-Perot structure; and
a dual cavity;
wherein the Fabry-Perot structure and the dual cavity have a similar hue angle within +/−45 degrees.

12. The pigment of claim 11, further comprising a magnetic-containing layer disposed between the Fabry-Perot structure and the dual cavity.

13. The pigment of claim 11, wherein the Fabry-Perot structure includes a 2 quarter wave optical thickness ranging from about 200 to about 400 nm.

14. The pigment of claim 11, wherein the Fabry-Perot structure includes a 4 quarter wave optical thickness ranging from about 400 to about 600 nm.

15. The pigment of claim 11, wherein the dual cavity comprises a reflector layer and a stack of alternating dielectric layers and absorber layers.

16. The pigment of claim 15, wherein the stack of alternating dielectric layers and absorber layers can include a first dielectric layer, a first absorber layer, a second dielectric layer, and a second absorber layer.

17. The pigment of claim 15, wherein the first and second dielectric layer each independently can include a quarter wave optical thickness chosen from a 2 quarter wave optical thickness, a 4 quarter wave optical thickness, and a 6 quarter wave optical thickness.

18. The pigment of claim 15, wherein the dual cavity comprises the first dielectric layer having a 2 quarter wave optical thickness ranging from about 200 to about 400 nm; and
the second dielectric layer having 4 quarter wave optical thickness ranging from about 400 to about 600 nm.

19. The pigment of claim 18, wherein the dual cavity comprises the first dielectric layer having a 4 quarter wave optical thickness ranging from about 400 to about 600 nm; and
the second dielectric layer having 6 quarter wave optical thickness ranging from about 600 to about 800 nm.

20. A color shifting colorant comprising:
the asymmetric pigment of claim 14; and a liquid medium.

* * * * *